United States Patent
Ida

(10) Patent No.: US 12,079,718 B2
(45) Date of Patent: Sep. 3, 2024

(54) DEVICE, METHOD AND PROGRAM FOR ERASING SELECT CONTRIBUTING LAYERS OF A NEURAL NETWORK

(71) Applicant: NIPPON TELEGRAPH AND TELEPHONE CORPORATION, Tokyo (JP)

(72) Inventor: Yasutoshi Ida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 1011 days.

(21) Appl. No.: 16/980,430

(22) PCT Filed: Apr. 4, 2019

(86) PCT No.: PCT/JP2019/015040
§ 371 (c)(1),
(2) Date: Sep. 14, 2020

(87) PCT Pub. No.: WO2019/194299
PCT Pub. Date: Oct. 10, 2019

(65) Prior Publication Data
US 2020/0410348 A1 Dec. 31, 2020

(30) Foreign Application Priority Data
Apr. 5, 2018 (JP) .................. 2018-073498

(51) Int. Cl.
*G06N 3/08* (2023.01)
*G06N 3/04* (2023.01)

(52) U.S. Cl.
CPC ................ *G06N 3/08* (2013.01); *G06N 3/04* (2013.01)

(58) Field of Classification Search
CPC ............ G06N 3/08; G06N 3/04; G06N 3/082
See application file for complete search history.

(56) References Cited

U.S. PATENT DOCUMENTS

| 10,755,136 B2 * | 8/2020 | Kadav ................ G06V 10/454 |
| 2017/0262737 A1 * | 9/2017 | Rabinovich ....... G06F 18/24137 |
| 2018/0232640 A1 * | 8/2018 | Ji ........................... G06N 3/045 |

FOREIGN PATENT DOCUMENTS

JP 2017-182319 A 10/2017

OTHER PUBLICATIONS

Andreas Veit, et al., "Residual Networks Behave Like Ensembles of Relatively Shallow Networks", Department of Computer Science & Cornell Tech, Cornell University, vol. 2, 2016, 9 pp.
Zuxuan Wu, et al., "BlockDrop: Dynamic Inference Paths in Residual Networks", vol. 4, 2017, 11 pp.
(Continued)

*Primary Examiner* — KC Chen
(74) *Attorney, Agent, or Firm* — XSENSUS LLP

(57) ABSTRACT

A learning device (10) calculates, for each layer in a multilayer neural network, a degree of contribution indicating a degree of contribution to an estimation result of the multilayer neural network, and selects a to-be-erased layer on the basis of the degree of contribution of each layer. The learning device (10) erases the to-be-erased layer from the multilayer neural network, and learns the multilayer neural network from which the to-be-erased layer has been erased.

12 Claims, 5 Drawing Sheets

(56) References Cited

OTHER PUBLICATIONS

Andreas Veit and Serge J. Belongie, "Convolutional Networks with Adaptive Inference Graphs", vol. 3, 2017, 12 pp.
Zehao Huang and Naiyan Wang, "Data-Driven Sparse Structure Selection for Deep Neural Networks", vol. 3, 2017, 18 pp.
Sergey Zagoruyko and Nikos Komodakis, "Paying More Attention To Attention: Improving the Performance of Convolutional Neural Networks via Attention Transfer", Published as a conference paper at ICLR 2017, 13 pp.
Jian-Hao Luo, et al., "ThiNet: A Filter Level Pruning Method for Deep Neural Network Compression", ICCV 2017, vol. 1, 2017, URL:https://arxiv.org/abs/1707.06342, 9 pp.

* cited by examiner

Require: training set D, initial learning rate $\eta$, number of Residual Units L, number of Residual Units to be erased at a time k, final number of Residual Units after the erasure L', number of epochs for retraining n
1: Initialize parameters of layers in ResNet and weights $\{w_l : l \in [L]\}$.
2: Train the model by using SGD with $\eta$.
3: Set l' = L and s = 0.
4: while l' > L' do
5:     s ← s + 1
6:     Set $I_s$ = {∅}.
7:     Select top-k small elements in absolute values of $\{w_l : l \in [L]\}$ and add the indices into $I_s$.
8:     Erase $w_i F(x_i)$ where $i \in I_s$.
9:     Retrain the model by using SGD with $\eta$ for n epochs.
10:    l' ← l' − k
11: end while

DEVICE, METHOD AND PROGRAM FOR ERASING SELECT CONTRIBUTING LAYERS OF A NEURAL NETWORK

CROSS-REFERENCE TO RELATED APPLICATIONS

The present application is based on PCT filing PCT/JP2019/015040, filed Apr. 4, 2019, which claims priority to JP 2018-073498, filed Apr. 5, 2018, the entire contents of each are incorporated herein by reference.

TECHNICAL FIELD

The present invention relates to a learning device, a learning method, and a learning program.

BACKGROUND ART

Machine learning is a technical field in which parameters of a model are learned so as to decrease an error function on the basis of observation data in tasks such as identification, regression, and clustering, to make estimations about unknown data. In particular, a technical field using a multilayer neural network (mainly, eight layers or more) fora model is called "deep learning".

In recent years, it is suggested that the estimation accuracy in deep learning increases when the number of layers is increased, and models having more than 1,000 layers have appeared. To implement such a large number of layers, it is common practice to use a residual network among models, which is a standard model in deep learning.

However, calculation cost have increased due to the increased number of layers in a multilayer neural network. Specifically, the calculation time and the memory consumption in estimation have increased, and it is difficult to mount such a multilayer neural network on mobile and IoT devices. Thus, methods for dynamically erasing layers in a multilayer neural network have been proposed.

CITATION LIST

Non Patent Literature

[NPL 1] Veit Andreas, Wilber Michael J. and Belongie Serge J. Residual Networks Behave Like Ensembles of Relatively Shallow Networks. In NIPS, pp. 550-558, 2016.

[NPL 2] Wu Zuxuan, Nagaraj an Tushar, Kumar Abhishek, Rennie Steven, Davis Larry S., Grauman Kristen and Feris Rogerio Schmidt. BlockDrop: Dynamic Inference Paths in Residual Networks. CoRR, abs/1711.08393, 2017.

[NPL 3] Veit Andreas and Belongie Serge J. Convolutional Networks with Adaptive Computation Graphs. CoRR, abs/1711.11503, 2017.

[NPL 4] Huang Zehao and Wang Naiyan. Data-Driven Sparse Structure Selection for Deep Neural Networks. CoRR, abs/1707.01213, 2017.

[NPL 5] Sergey Zagoruyko and Nikos Komodakis. Paying More Attention to Attention: Improving the Performance of Convolutional Neural Networks via Attention Transfer. CoRR, abs/1612.03928, 2016.

SUMMARY OF THE INVENTION

Technical Problem

The conventional technologies, however, have a problem in that layers in a multilayer neural network cannot be erased while preventing reduction in accuracy. For example, in the conventional methods for dynamically erasing layers (see, for example, NPL 2 and 3), the accuracy reduces as a larger number of layers are erased. Note that, as a conventional technology, there is a method in which another model is separately prepared in order to select to-be-erased layers and layers in a multilayer neural network are dynamically erased. In this method, however, the memory consumption increases.

The present invention has been made in view of the above, and it is an object thereof to erase a layer in a multilayer neural network while preventing reduction in accuracy.

Means for Solving the Problem

In order to solve the above-mentioned problems and achieve the object, a learning device in the present invention includes: a calculation unit for calculating, for each layer in a multilayer neural network, a degree of contribution indicating a degree of contribution to an estimation result of the multilayer neural network; a selection unit for selecting a to-be-erased layer on the basis of the degree of contribution of each layer calculated by the calculation unit; an erasure unit for erasing the to-be-erased layer, selected by the selection unit, from the multilayer neural network; and a learning unit for learning the multilayer neural network from which the to-be-erased layer has been erased by the erasure unit.

A learning method in the present invention to be executed by a learning device includes: a calculation step for calculating, for each layer in a multilayer neural network, a degree of contribution indicating a degree of contribution to an estimation result of the multilayer neural network; a selection step for selecting a to-be-erased layer on the basis of the degree of contribution of each layer calculated at the calculation step; an erasure step for erasing the to-be-erased layer, selected at the selection step, from the multilayer neural network; and a learning step for learning the multilayer neural network from which the to-be-erased layer has been erased at the erasure step.

A learning program in the present invention causes a computer to execute: a calculation step for calculating, for each layer in a multilayer neural network, a degree of contribution indicating a degree of contribution to an estimation result of the multilayer neural network; a selection step for selecting a to-be-erased layer on the basis of the degree of contribution of each layer calculated at the calculation step; an erasure step for erasing the to-be-erased layer, selected at the selection step, from the multilayer neural network; and a learning step for learning the multilayer neural network from which the to-be-erased layer has been erased at the erasure step.

Effects of the Invention

The present invention exhibits an effect that a layer in a multilayer neural network can be erased while preventing reduction in accuracy.

BRIEF DESCRIPTION OF DRAWINGS

FIG. 3 is a diagram illustrating an example of pseudocode of the processing by the learning device according to the first embodiment.

DESCRIPTION OF EMBODIMENTS

A learning device, a learning method, and a learning program according to an embodiment of the present application are described in detail below with reference to the drawings. Note that the learning device, the learning method, and the learning program according to the present application are not limited by the embodiment.

First Embodiment

In the following embodiment, a residual network as a kind of multilayer neural networks is first described, the configuration of the learning device and the flow of processing in the learning device according to the first embodiment are sequentially described, and effects by the first embodiment are described last.

[Multilayered Neural Network]

A residual network is a kind of multilayer neural networks in which units called residual units are stacked to construct a multilayer structure. The residual unit is expressed by Formula (1) below.

[Formula 1]

$$x_{l+1} = x_l + F(x_l) \quad (1)$$

$x_l$ is a signal input to the l-th residual unit, and F ($x_l$) is non-linear mapping (function) using the input signal $x_l$ as an argument. $x_0$ as the first input signal corresponds to, for example, a pixel value of an image in the case of image recognition. Various construction methods for F ($x_l$) are known. For example, as in NPL 1, convolutional layers, batch normalization, and ReLU are combined for construction. By applying Formula (1) to l recursively, a multilayer structure of the residual network can be constructed. By setting a softmax function and a cross entropy error function to the last layer, for example, an image classifier can be constructed.

In this case, the residual network estimates a category of images. In the residual network, a layer can be erased by erasing F ($x_l$) from the residual unit in Formula (1) above. This is because, when F ($x_l$) is erased from Formula (1) above, $x_{l+1} = x_l$ holds, and hence the input signal can be transferred to a residual unit in a higher layer as is as an argument without disconnecting the input signal.

A learning device 10 according to the first embodiment is a learning device using a multilayer neural network (residual network). The learning device 10 is described below.

[Configuration of Learning Device]

Figure 1:
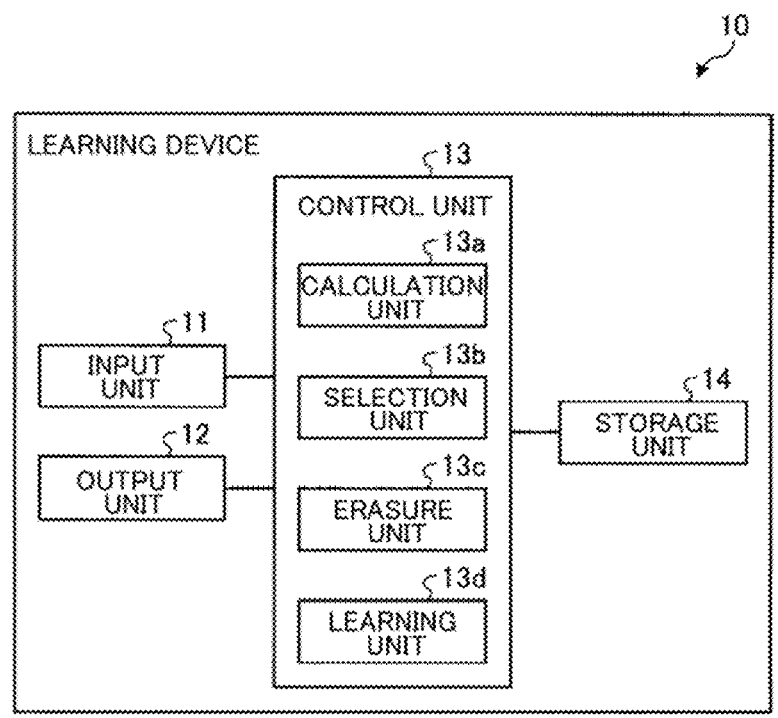
FIG. 1 is a block diagram illustrating a configuration example of a learning device according to a first embodiment.

Referring to FIG. 1, the configuration of the learning device 10 is described. FIG. 1 is a block diagram illustrating a configuration example of the learning device according to the first embodiment. As illustrated in FIG. 1, the learning device 10 includes an input unit 11, an output unit 12, a control unit 13, and a storage unit 14. Processing of each unit in the learning device 10 is described below.

The input unit 11 is implemented by using input devices such as a keyboard and a mouse, and inputs various kinds of instruction information to the control unit 13 in response to input operation by an operator. The output unit 12 is implemented by a display device such as a liquid crystal display, a printing device such as a printer, an information communication device, or a speaker.

The storage unit 14 stores therein data and programs necessary for various kinds of processing by the control unit 13. For example, the storage unit 14 is a semiconductor memory device such as a random access memory (RAM) and a flash memory, or a storage device such as a hard disk and an optical disc.

The control unit 13 has an internal memory for storing therein programs defining various kinds of processing procedures and necessary data, and executes various kinds of processing using the programs and data. As units particularly closely related to the present invention, the control unit 13 includes a calculation unit 13a, a selection unit 13b, an erasure unit 13c, and a learning unit 13d. The control unit 13 is an electronic circuit such as a central processing unit (CPU) and a micro processing unit (MPU) or an integrated circuit such as an application specific integrated circuit (ASIC) and a field programmable gate array (FPGA).

The calculation unit 13a calculates, for each layer in a multilayer neural network, the degree of contribution indicating the degree of contribution to an estimation result of the multilayer neural network. For example, the calculation unit 13a implements the calculation by changing Formula (1) above to Formula (2) below.

[Formula 2]

$$x_{l+1} = x_l + w_l F(x_l) \quad (2)$$

$w_l$ is a scalar value acquired by learning similarly to other parameters, and is called "degree of contribution". When the absolute value of the degree of contribution $w_l$ is small, the absolute value of output of $w_l F$ ($x_l$) is scaled to be small. In other words, when the absolute value of the degree of contribution $w_l$ is small, the output of $w_l F$ ($x_l$) has little influence on a residual unit in a higher layer. Thus, in this embodiment, the absolute value of the degree of contribution $w_l$ is treated as an index for calculating the degree of contribution to the estimation result. As another method for calculating the degree of contribution, a method using a norm of a parameter included in F (xl) is conceivable. Examples of the norm include the Frobenius norm and the maximum norm. The norm is calculated for each F (xl), and the calculated value is treated as the degree of contribution. In the case of treating the norm as the degree of contribution, a model is constructed by Formula (1) rather than Formula (2). The degree of contribution in the case of using the norm may be set to be larger as the value of the norm becomes larger, or may be set to be larger as the value of the norm becomes smaller.

The selection unit 13b selects a to-be-erased layer on the basis of the degree of contribution of each layer calculated by the calculation unit 13a. For example, the selection unit 13b compares the degrees of contribution of layers calculated by the calculation unit 13a, and selects a predetermined number of layers having small degrees of contribution as to-be-erased layers. Note that the predetermined number is a predetermined number that can be freely set and changed by a user. The selection unit 13b selects a predetermined number of layers that can be freely set and changed as to-be-erased layers. As the predetermined number becomes larger, that is, the number of layers to be erased at a time becomes larger, processing load becomes lower. As the predetermined number becomes smaller, that is, the number of layers to be erased at a time becomes smaller, the reduction in accuracy can be suppressed as compared to that before the erasing. Note that the predetermined number is hereinafter referred to as "k". For example, the selection unit 13b uses the absolute value of the degree of contribution $w_l$ in Formula (2) above after learning as an index, and selects k residual units having small absolute values.

The erasure unit 13c erases the to-be-erased layers selected by the selection unit 13b from the multilayer neural network. For example, the erasure unit 13c erases the k residual units selected by the selection unit 13b. In other words, the erasure unit 13c erases $w_l F(x_l)$ from Formula (2) above for the k residual units selected by the selection unit 13b.

The learning unit 13d learns the multilayer neural network from which the to-be-erased layers have been erased by the erasure unit 13c. For example, the learning unit 13d performs relearning by using parameters after the layer in the residual unit is erased as initial values. In this case, various optimizers can be used for learning. For example, stochastic gradient descent (SGD) can be used (see, for example, NPL 1). The initial learning rate of the optimizer in this case is set to substantially the same magnitude as the initial learning rate used in the first learning, and n epochs are optimized until the accuracy is resumed. In this manner, the estimation accuracy that has reduced due to erasing is repaired. In this case, another error function than the original error function can also be used for learning. Examples of the error function include a loss function such as attention transfer loss (see, for example, NPL 5).

Figure 2:
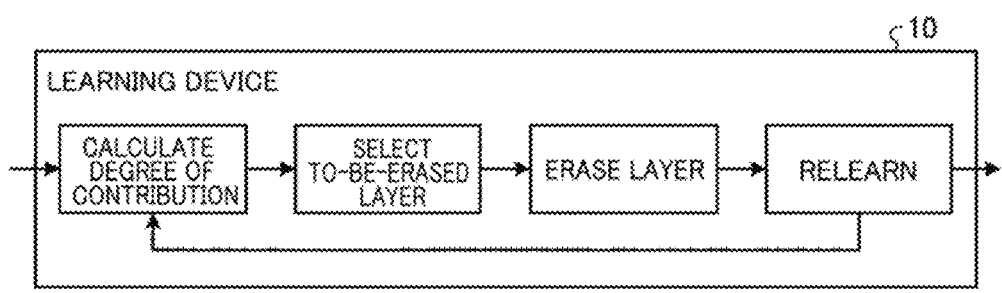
FIG. 2 is a diagram for describing the outline of processing by the learning device according to the first embodiment.

Referring to an example in FIG. 2, the outline of processing by the learning device 10 according to the first embodiment is described. FIG. 2 is a diagram for describing the outline of processing by the learning device according to the first embodiment. As exemplified in FIG. 2, the learning device 10 calculates the degree of contribution of each layer in the multilayer neural network to an estimation result, and selects a layer to be erased on the basis of the degree of contribution. Subsequently, the learning device 10 erases the selected layer, and performs learning again after the layer is erased. Then, the learning device 10 repeatedly applies the above-mentioned processing until the number of layers in the multilayer neural network reaches a target value, and can thereby reduce the number of layers.

In this manner, the learning device 10 introduces a contribution rate indicating how much each layer in a multilayer neural network affects the accuracy, and erases a layer in accordance with the contribution rate after learning. In addition, the learning device 10 performs relearning after erasing to recover the accuracy. By repeating the erasing and the relearning, the learning device 10 can erase a plurality of layers. As a result, the learning device 10 can provide a multilayer neural network capable of efficiently obtaining estimation results with a small number of layers.

[Pseudocode]

Next, pseudocode for implementing the processing by the learning device 10 is described. FIG. 3 is a diagram illustrating an example of pseudocode for implementing the processing by the learning device according to the first embodiment. Main symbols are listed in the following table. In the following descriptions, the same symbols are used.

TABLE 1

| Symbol | Definition |
| --- | --- |
| $x_l$ | Input signal to first residual unit |
| F (•) | Non-linear mappings in residual unit |
| $w_l$ | Degree of contribution of first residual unit |
| k | Number of residual units erased by single erasing |

TABLE 1-continued

| Symbol | Definition |
| --- | --- |
| D | Learning data set |
| η | Learning rate of stochastic gradient descent |
| L | Total number of first residual units |
| L' | Target number of residual units |
| n | Number of epochs for relearning |
| l' | Number of residual units being processed |
| s | Variable for recording number of times of erasing |
| Is | Set of indices of residual units to be erased |

As exemplified in FIG. 3, the learning device 10 provides a learning data set D, an initial learning rate η, the number L of residual units, the number k of residual units to be erased at a time, a target value L' of the final number of residual units after the erasure, and an iteration number n after relearning.

First, the learning device 10 initializes parameters to be learned for a residual network (see line number 1 in FIG. 3). Next, an appropriate optimizer (for example, SGD) is used to learn the residual network (see line number 2 in FIG. 3). The learning device 10 gradually erases residual units, and hence initializes l' that records the number of remaining residual units and the number of times of erasing s (see line number 3 in FIG. 3).

Then, when the remaining number l' of residual units is larger than the target value L', the learning device 10 repeats the erasure of residual units and the relearning (see line number 4 in FIG. 3). The learning device 10 increments the number of times of erasing s when executing the erasing of a residual unit (see line number 5 in FIG. 3). The learning device 10 initializes a set Is that records indices of residual units to be erased (see line number 6 in FIG. 3).

Subsequently, the learning device 10 selects k (for example, 1) residual units whose absolute value of the degree of contribution $w_l$ is small, and adds the index thereof to Is (see line number 7 in FIG. 3). The learning device 10 erases, for indices included in Is, $w_l F(x_l)$ in the residual unit in Formula (2) above (see line number 8 in FIG. 3). Then, the learning device 10 performs n epoch learning of the residual network after the residual units are erased at the initial learning rate η (see line number 9 in FIG. 3). After that, the learning device 10 subtracts the number of erased residual units k from the number of remaining residual units l' (see line number 10 in FIG. 3). Then, the learning device 10 repeats the erasing of residual units and the relearning until the number of remaining residual units l' has reached a target value L' (see line numbers 4 to 11 in FIG. 3).

[Flow of Processing in Learning Device]

Figure 4:
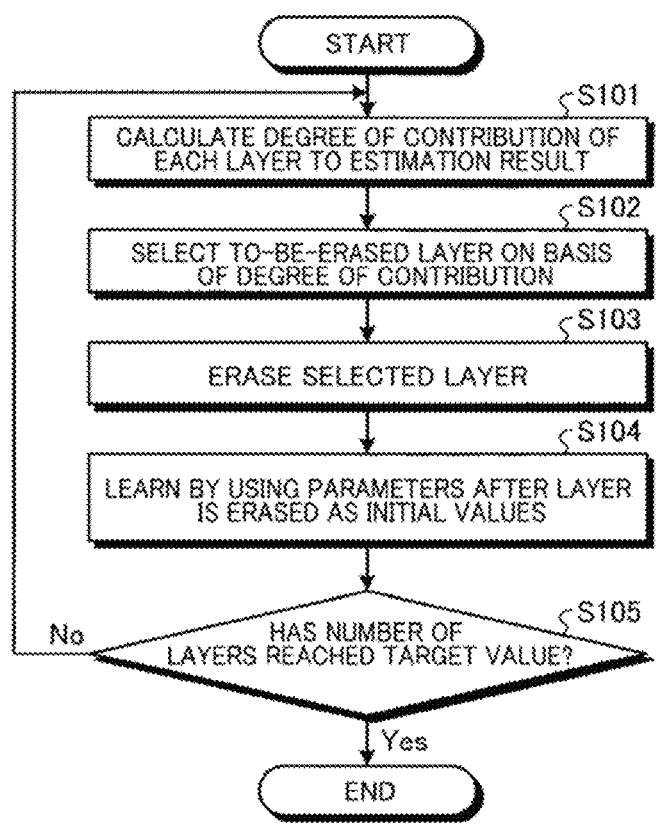
FIG. 4 is a flowchart for describing the processing by the learning device according to the first embodiment.

Next, the flow of processing in the learning device 10 according to the first embodiment is described with reference to FIG. 4. FIG. 4 is a flowchart for describing the processing by the learning device according to the first embodiment.

As illustrated in FIG. 4, the calculation unit 13a in the learning device 10 calculates, for each layer in a multilayer neural network, the degree of contribution indicating the degree of contribution to an estimation result of the multilayer neural network (Step S101). Then, the selection unit 13b selects a to-be-erased layer on the basis of the degree of contribution of each layer calculated by the calculation unit 13a (Step S102). For example, the selection unit 13b compares the degrees of contribution of layers calculated by the calculation unit 13a, and selects k residual units having low degrees of contribution.

Subsequently, the erasure unit 13c erases the to-be-erased layer, selected by the selection unit 13b, from the multilayer neural network (Step S103). For example, the erasure unit 13c erases the k residual units selected by the selection unit 13b. In other words, the erasure unit 13c erases $w_i F(x_i)$ from Formula (2) above for the k residual units selected by the selection unit 13b.

Then, the learning unit 13d trains the multilayer neural network from which the to-be-erased layers have been erased by the erasure unit 13c (Step S104). For example, the learning unit 13d performs relearning by using parameters after a layer in a residual unit is erased as initial values.

After that, the learning unit 13d determines whether the number of layers has reached a target value as a result of the erasure of the to-be-erased layers by the erasure unit 13c (Step S105) and, when determining that the number of layers is larger than the target value (negative at Step S105), returns to the processing at Step S101 to repeat the above-mentioned processing. When determining that the number of layers has reached the target value (positive at Step S105), the learning unit 13d finishes the processing without any further processing.

Effects in First Embodiment

In this manner, the learning device 10 according to the first embodiment calculates, for each layer in a multilayer neural network, the degree of contribution indicating the degree of contribution to an estimation result of the multilayer neural network, and selects a to-be-erased layer on the basis of the degree of contribution of each layer. Then, the learning device 10 erases the selected to-be-erased layer from the multilayer neural network, and trains the multilayer neural network from which the to-be-erased layer has been erased. In other words, in the learning device 10, a layer having a small degree of contribution based on the degree of contribution of each layer to an estimation result is erased, and relearning is performed on a model after the erasing to prevent the reduction in accuracy. Thus, the learning device 10 can erase layers in a multilayer neural network while preventing the reduction in accuracy.

The number of layers in a model learned by the learning device 10 decreases, and hence the memory consumption for estimation is reduced. Thus, the estimation can be performed with small memory consumption. The model learned by the learning device 10 realizes higher accuracy than that before layers are erased due to the experience, and hence the estimation can be performed with high accuracy. Because the number of layers in the model learned by the learning device 10 decreases, the calculation time can be shortened to perform the estimation at high speed.

[System Configuration, Etc.]

The components in the illustrated devices are functionally conceptual, and are not necessarily required to be physically configured as illustrated. In other words, a specific mode for dispersion and integration of the devices is not limited to the illustrated one, and all or part of the devices can be functionally or physically dispersed and integrated in any unit depending on various kinds of loads, usage conditions, and any other parameter. In addition, all or any part of the processing functions executed by the devices may be implemented by a CPU and programs analyzed and executed by the CPU, or implemented by hardware by wired logic.

Among the pieces of processing described in this embodiment, all or part of the processing that is described as being automatically executed can also be manually executed, or all or part of the processing that is described as being manually executed can also be automatically executed by a known method. In addition, the processing procedure, the control procedures, the specific names, and the information including various kinds of data and parameters described herein and illustrated in the accompanying drawings can be freely changed unless otherwise specified.

[Program]

Figure 5:
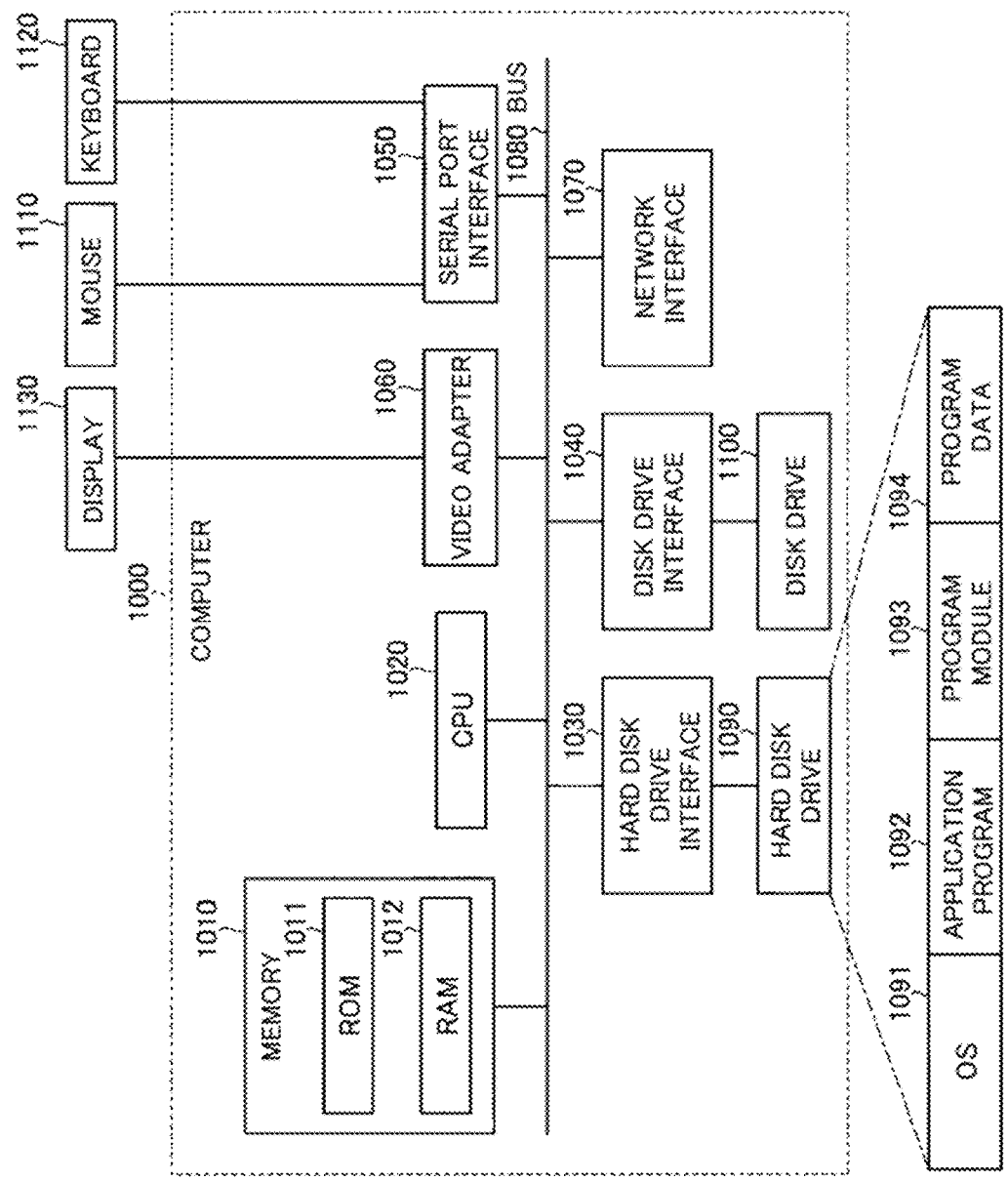
FIG. 5 is a diagram illustrating a computer for executing a learning program.

FIG. 5 is a diagram illustrating a computer for executing a learning program. For example, a computer 1000 includes a memory 1010 and a CPU 1020. The computer 1000 includes a hard disk drive interface 1030, a disk drive interface 1040, a serial port interface 1050, a video adapter 1060, and a network interface 1070. The units are connected by a bus 1080.

The memory 1010 includes a read only memory (ROM) 1011 and a RAM 1012. For example, the ROM 1011 stores therein a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disc is inserted to the disk drive 1100. For example, the serial port interface 1050 is connected to a mouse 1051 and a keyboard 1052. For example, the video adapter 1060 is connected to a display 1061.

For example, the hard disk drive 1090 stores therein an OS 1091, an application program 1092, a program module 1093, and program data 1094. In other words, programs for defining processing in the learning device 10 are implemented as the program module 1093 in which computer-executable codes are written. For example, the program module 1093 is stored in the hard disk drive 1090. For example, the program module 1093 for executing the same processing as the functional configurations in the device is stored in the hard disk drive 1090. The hard disk drive 1090 may be substituted by a solid state drive (SSD).

Data used for the processing in the above-mentioned embodiment is stored in, for example, the memory 1010 or the hard disk drive 1090 as the program data 1094. The CPU 1020 reads and executes the program module 1093 and the program data 1094 stored in the memory 1010 and the hard disk drive 1090 onto the RAM 1012 as needed.

The program module 1093 and the program data 1094 are not necessarily required to be stored in the hard disk drive 1090, and, for example, may be stored in a removable storage medium and read by the CPU 1020 through the disk drive 1100. Alternatively, the program module 1093 and the program data 1094 may be stored in another computer connected through a network or a WAN. The program module 1093 and the program data 1094 may be read from another computer by the CPU 1020 through the network interface 1070.

REFERENCE SIGNS LIST

10 Learning device
11 Input unit
12 Output unit
13 Control unit
13a Calculation unit
13b Selection unit
13c Erasure unit
13d Learning unit
14 Storage unit

The invention claimed is:

1. A learning device, comprising:
a memory; and
a processor, coupled to the memory, configured to:
calculate, for each layer of a plurality of layers within a multilayer neural network, a degree of contribution based on a norm of a non-linear mapping corresponding to each layer indicating a degree of contribution to an estimation result of the multilayer neural network, wherein the multilayer neural network is a residual network and the plurality of layers include residual units that are stacked to construct the multilayer neural network;
select one or more to-be-erased layers from the plurality of layers within the multilayer neural network based on comparing the degree of contribution of each layer of the multilayer neural network and selecting a predetermined number of layers having lower degrees of contribution than all other layers not selected;
erase the one of more to-be-erased layers from the multilayer neural network by erasing the non-linear mapping from residual units of the multilayer neural network corresponding to the one or more to-be-erased layers;
retrain the multilayer neural network from which the one or more to-be-erased layers have been erased, wherein the learning device performs estimation with decreased memory consumption after the one or more to-be-erased layers have been erased; and
perform image recognition using the retrained multilayer neural network.

2. The learning device according to claim 1, wherein the processor selects a user-defined predetermined number of layers as the one or more to-be-erased layers.

3. The learning device according to claim 1, wherein the one or more to-be-erased layers are selected based on an absolute value of the degree of contribution of each layer of the plurality of layers.

4. The learning device according to claim 1, wherein a last layer of the multilayer neural network includes a softmax function.

5. The learning device according to claim 1, wherein a last layer of the multilayer neural network includes a cross entropy error function.

6. The learning device according to claim 4, wherein erasure of the one or more to-be-erased layers result in passage of an input to the one or more to-be-erased layers to a next layer in the multilayer neural network.

7. The learning device according to claim 6, wherein the norm includes a Frobenius norm.

8. The learning device according to claim 6, wherein the norm includes a maximum norm.

9. The learning device according to claim 7, wherein the processor uses stochastic gradient descent to retrain the multilayer neural network.

10. The learning device according to claim 7, wherein the processor repeatedly performs the calculation of the degree of contribution, the selection of the one or more to-be-erased layers, the erasure of the one or more to-be-erased layers, and the retraining of the multilayer neural network until the multilayer neural network reaches a target number of layers of the plurality of layers.

11. A learning method to be executed by a learning device, comprising:
calculating, for each layer of a plurality of layers within a multilayer neural network, a degree of contribution based on a norm of a non-linear mapping corresponding to each layer indicating a degree of contribution to an estimation result of the multilayer neural network, wherein the multilayer neural network is a residual network and the plurality of layers include residual units that are stacked to construct the multilayer neural network;
selecting one or more to-be-erased layers from the plurality of layers of the multilayer neural network based on comparing the degree of contribution of each layer of the plurality of layers and selecting a predetermined number of layers having lower degrees of contribution than all other layers not selected;
erasing the one or more to-be-erased layers from the multilayer neural network by erasing the non-linear mapping from residual units of the multilayer neural network corresponding to the one or more to-be-erased layers;
retraining the multilayer neural network from which the one or more to-be-erased layers have been erased, wherein the learning device performs estimation with decreased memory consumption after the one or more to-be-erased layers have been erased; and
performing image recognition using the retrained multilayer neural network.

12. A non-transitory computer-readable medium encoded with a learning program that, when executed by a computer, cause the computer to perform a method comprising:
calculating, for each layer of a plurality of layers within a multilayer neural network, a degree of contribution based on a norm of a non-linear mapping corresponding to each layer indicating a degree of contribution to an estimation result of the multilayer neural network, wherein the multilayer neural network is a residual network, and the plurality of layers include residual units that are stacked to construct the multilayer neural network;
selecting one or more to-be-erased layers from the plurality of layers of the multilayer neural network based on comparing the degree of contribution of each layer of the plurality of layers and selecting a predetermined number of layers having lower degrees of contribution than all other layers not selected;
erasing the one or more to-be-erased layers from the multilayer neural network by erasing the non-linear mapping from residual units of the multilayer neural network corresponding to the one or more to-be-erased layers;
retraining the multilayer neural network from which the one or more to-be-erased layers have been erased, wherein the learning device performs estimation with decreased memory consumption after the one or more to-be-erased layers have been erased; and
performing image recognition using the retrained neural network.

* * * * *